US012743436B2

(12) United States Patent
Lu

(10) Patent No.: US 12,743,436 B2
(45) Date of Patent: Sep. 22, 2026

(54) DATA QUERY METHOD AND RELATED APPARATUS

(71) Applicant: MASHANG CONSUMER FINANCE CO., LTD., Chongqing (CN)

(72) Inventor: Quan Lu, Chongqing (CN)

(73) Assignee: MASHANG CONSUMER FINANCE CO., LTD., Chongqing (CN)

( * ) Notice: Subject to any disclaimer, the term of this patent is extended or adjusted under 35 U.S.C. 154(b) by 0 days.

(21) Appl. No.: 18/990,688

(22) Filed: Dec. 20, 2024

(65) Prior Publication Data

US 2025/0384052 A1 Dec. 18, 2025

(30) Foreign Application Priority Data

Jun. 12, 2024 (CN) ......................... 202410757569.6

(51) Int. Cl.
*G06F 16/2453* (2019.01)
*G06F 16/22* (2019.01)
*G06F 16/2455* (2019.01)
*G06F 16/2458* (2019.01)

(52) U.S. Cl.
CPC .......... *G06F 16/2471* (2019.01); *G06F 16/22* (2019.01); *G06F 16/2453* (2019.01); *G06F 16/24553* (2019.01)

(58) Field of Classification Search
CPC ............. G06F 16/2471; G06F 16/2453; G06F 16/24553; G06F 16/22
See application file for complete search history.

(56) References Cited

U.S. PATENT DOCUMENTS 10,459,918 B1 * 10/2019 Edwards, Jr. ......... G06F 16/278
2021/0157811 A1 * 5/2021 Wang .................. G06F 16/2477
2022/0156260 A1 * 5/2022 Edara .................. G06F 16/2237
2023/0086203 A1 * 3/2023 Martin ................ G06F 16/2379 707/602
2023/0281173 A1 * 9/2023 Jaisawal ............ G06F 16/2358 707/692
2024/0330341 A1 * 10/2024 Xie ..................... G06F 16/3338
2024/0378194 A1 * 11/2024 Zhu ..................... G06F 16/2425
2025/0005018 A1 * 1/2025 Liu ....................... G06F 16/212
2025/0225123 A1 * 7/2025 Depoutovitch ..... G06F 16/2379

* cited by examiner

*Primary Examiner* — Huawen A Peng

(74) *Attorney, Agent, or Firm* — ARENTFOX SCHIFF LLP

(57) ABSTRACT

The present disclosure provides a data query method. In the method, a first query result of a first database in response to a first query request is obtained. The first database stores data within a first time window. A second query result of a second database is obtained when the first query result does not meet a preset check condition. The second database stores data within a second time window. A start time of the second time window being after a start time of the first time window. A target query result based on at least one of the first query request and the second query result is generated by processing circuitry. An update frequency of the second database is higher than an update frequency of the first database.

17 Claims, 6 Drawing Sheets

DATA QUERY METHOD AND RELATED APPARATUS

RELATED APPLICATION

The present application claims priority to Chinese Patent Application No. 202410757569.6 filed on Jun. 12, 2024. The entire disclosure of the prior application is hereby incorporated by reference.

FIELD OF THE TECHNOLOGY

The present disclosure relates to the field of data processing technologies, including to a data query method and a related apparatus.

BACKGROUND OF THE DISCLOSURE

With the increasing development of the Internet, there is an increasing amount of data available for querying in a data query scenario. For example, big data is a data set with a large capacity, a large number of types, a high access speed, and a high application value as main features. A big data technology can be used to perform acquisition, storage, and correlation analysis on data with a large amount, scattered sources, and diverse formats, to resolve specific service issues. Big data may be stored by using a distributed architecture.

Because data information such as big data includes a large number of information items, the query difficulty can be high, making it difficult to implement comprehensive and accurate query processing.

SUMMARY

The present disclosure provides a data query method and apparatus, an electronic device, and a non-transitory computer-readable storage medium.

According to an aspect, the present disclosure provides a data query method. In the method, a first query result corresponding to a first database in response to a first query request is obtained. The first database stores data within a first time window. A second query result of a second database is obtained when the first query result does not meet a preset check condition. The second database stores data within a second time window. A start time of the second time window being after a start time of the first time window. A target query result based on at least one of the first query request and the second query result is generated by processing circuitry. An update frequency of the second database is higher than an update frequency of the first database.

According to an aspect, the present disclosure provides a data query apparatus, including processing circuitry. The processing circuitry is configured to obtain a first query result of a first database in response to a first query request. The first database stores data within a first time window. The processing circuitry is configured to obtain a second query result of a second database when the first query result does not meet a preset check condition. The second database stores data within a second time window. A start time of the second time window being after a start time of the first time window. The processing circuitry is configured to generate a target query result based on at least one of the first query request and the second query result. An update frequency of the second database is higher than an update frequency of the first database.

According to an aspect, the present disclosure provides an electronic device, including at least one processor and a memory communicatively connected to the at least one processor. The memory having one or more computer programs executable by the at least one processor stored therein, the one or more computer programs being executed by the at least one processor, to cause the at least one processor to perform any of the data query methods as described in the aspects of the present disclosure.

According to an aspect, the present disclosure provides a non-transitory computer-readable storage medium, storing instructions which when executed by a processor of an electronic device, cause the processor to perform any of the data query methods as described in the aspects of this disclosure.

According to an aspect, the present disclosure provides a computer program product, including computer-readable code or a non-volatile computer-readable storage medium carrying computer-readable code, when the computer-readable code is run in a processor of an electronic device, the processor of the electronic device performing any of the data query methods as described in the aspects of this disclosure.

In the data query method provided in the embodiments of the present disclosure, a first database is first queried according to a query request, and a second database is further queried when a query result does not meet a preset check condition, where the second database is configured to store a second service document generated within a current time period. The first database is configured to store a first service document generated within a historical time period, and an update frequency of the second database is higher than an update frequency of the first database. The first database is configured to store long-term data. Because the long-term data is more comprehensive, comprehensiveness and consistency of data are ensured. The second database is configured to store short-term data. Because the short-term data has a higher update frequency, better real-time performance is ensured, and document content that has just been generated recently can be more fully covered. When the first database has a larger amount of information and more comprehensive content, the first database is first queried, to facilitate quickly obtaining a comprehensive query result. In addition, when a first query result of the first database does not meet the preset check condition, it indicates that appropriate data cannot be queried in the first database currently. In this case, to expand a query range so that recently generated data content can be queried in time, the second database is further queried. Data stored in the second database is recently generated and has not been synchronized to the first database. Therefore, accuracy and real-time performance of data can be considered through complementary of the two databases, thereby improving data query efficiency, and facilitating implementing comprehensive and accurate query processing.

Content described in this section is not intended to limit the scope of the present disclosure. Other features of the present disclosure will become more comprehensible through the following specification.

BRIEF DESCRIPTION OF THE DRAWINGS

The accompanying drawings are used to provide further understanding of the present disclosure and constitute a part of this specification, are used to explain the present disclosure in combination with the embodiments of the present disclosure, and do not constitute a limitation to the present disclosure. The foregoing and other features and advantages will become more apparent to a person skilled in the art by describing detailed examples with reference to the accompanying drawings. In the accompanying drawings.

DETAILED DESCRIPTION

Figure 1:
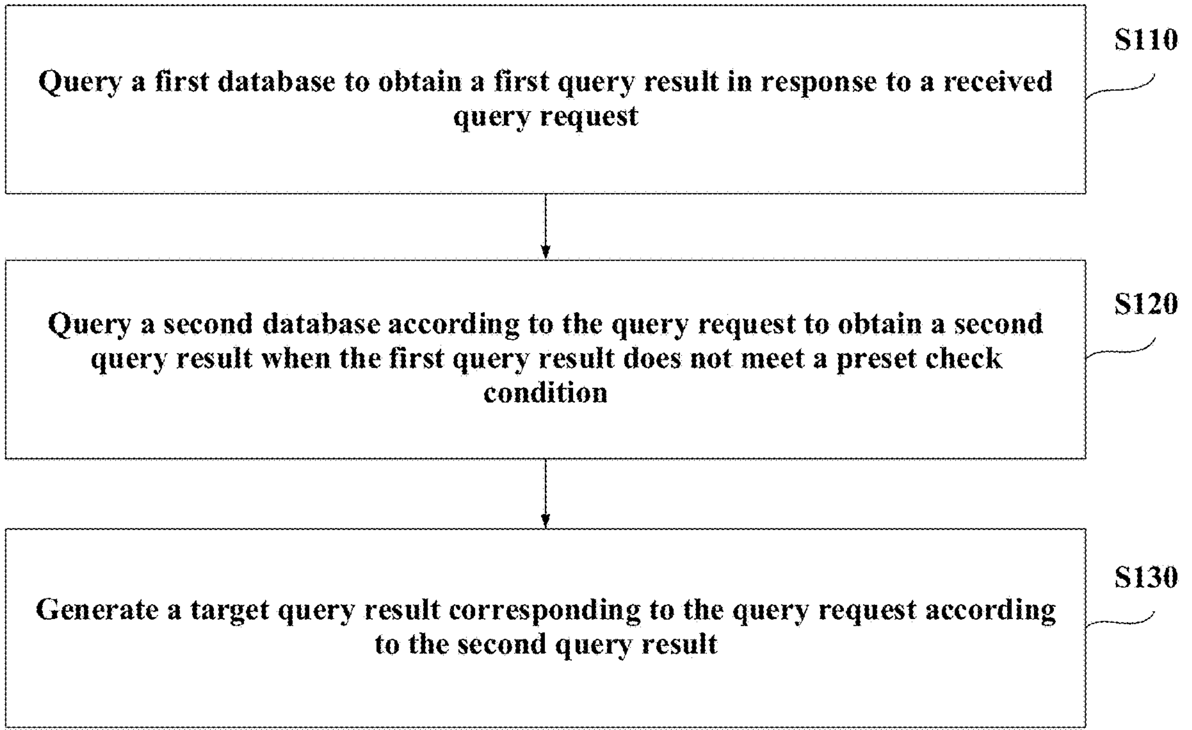
FIG. 1 is a flowchart of a data query method according to an embodiment of the present disclosure.

To help a person skilled in the art better understand the technical solutions of the present disclosure, examples of the present disclosure are described below with reference to the accompanying drawings. Various details of the embodiments of the present disclosure are included to facilitate understanding. The details are to be considered as merely examples. Therefore, a person of ordinary skill in the art is to recognize that various changes and modifications may be made to the embodiments described herein without departing from the scope and spirit of the present disclosure.

The examples of the present disclosure and features in the embodiments may be mutually combined in a case that no conflict occurs.

As used in this specification, the use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

Terms used in this specification are merely used to describe examples, and are not intended to limit the present disclosure. As used in this specification, terms "one" and "the" which are singular forms may also include plural forms, unless otherwise specified in the context clearly. The terms "include" and/or "formed by . . . " used in this specification refer to the presence of stated features, whole system, steps, operations, elements, and/or components, but do not exclude the presence or addition of one or more other features, whole system, steps, operations, elements, components, and/or combinations thereof. "Connection", "connected", or a similar term is not limited to a physical or mechanical connection, but may include an electrical connection, whether direct or indirect.

Unless otherwise defined, meanings of all technical and scientific terms used in this specification are the same as those usually understood by a person skilled in the art. Terms such as those defined in a commonly used dictionary are to be interpreted as having meanings consistent with their meanings in the context of the related art and the present disclosure, and are not to be interpreted as having idealized or excessively formal meanings, unless otherwise clearly defined in this specification.

In the related art, because data information such as big data includes a large number of information items, the query difficulty can be high, making it difficult to implement comprehensive and accurate query processing. To resolve the foregoing problem, in this disclosure, a first database is configured to store long-term data. Because the long-term data is more comprehensive, comprehensiveness and consistency of data can be improved. A second database is configured to store short-term data. Because the short-term data has a higher update frequency, real-time performance can be improved, and document content that has just been generated recently can be more fully covered. Therefore, accuracy and real-time performance of data can be considered through complementary of the two databases, thereby improving data query efficiency, and facilitating implementing comprehensive and accurate query processing.

A data query method according to the embodiments of the present disclosure may be performed by an electronic device such as a terminal device or a server. The terminal device may be user equipment (UE), a mobile device, a user terminal, a terminal, a cellular phone, a cordless phone, a personal digital assistant (PDA), a handheld device, a computing device, an in-vehicle device, a wearable device, or the like. The server may be an independent physical server, a server cluster formed by a plurality of physical servers, or a cloud server that can perform cloud computing. The method may be implemented by a processor invoking computer-readable program instructions stored in a memory.

FIG. 1 is a flowchart of a data query method according to an embodiment of the present disclosure. Referring to FIG. 1, the method includes the following operations.

Operation S110: Query a first database to obtain a first query result in response to a received query request.

The query request may be triggered by a user request, or may be triggered by a system request. This is not limited in this disclosure. The first database may also be referred to as a long-term database, to persistently store service data. Data content stored in the first database is more comprehensive. The first query result is configured for representing data content matching the query request in the first database. The first query result includes two cases: The query result is null, and the query result is non-null. In an example, target query information included in the query request may be obtained, and querying may be performed based on the target query information. The target query information is to-be-queried information determined according to the query request, and may be specifically a key letter, a keyword, a key statement, or the like included in the query request. In an example, to ensure comprehensiveness of the query result, in operation S110, the querying a first database, to obtain a first query result may be implemented in a plurality of query manners. Specifically, a plurality of sub-databases corresponding to the first database are queried in the plurality of query manners, to obtain a plurality of query sub-results; and the plurality of query sub-results are merged, to obtain the first query result. In an example, the plurality of query sub-results can be obtained in the plurality of query manners respectively, and the plurality of query sub-results are merged, to ensure that the finally obtained first query result is more comprehensive and accurate.

In an example, the plurality of query manners include at least two of the following:

a first query manner, configured to convert target query information included in the received query request into a target query vector by vector conversion processing, and query a first sub-database according to the target query vector, where the first sub-database is obtained through vector conversion processing on the first service document;

a second query manner, configured to perform named entity recognition on target query information included in the received query request, to obtain an entity tag corresponding to the target query information, and query a second sub-database by tag querying, where the second sub-database is obtained by adding an entity tag to the first service document; or a third query manner, configured to query a third sub-database by index querying according to target query information included in the received query request, where the third sub-database is obtained based on a distributed index created by a distributed search engine.

In an example, the vector conversion processing includes word vector conversion processing and sentence vector conversion processing, and there are at least two types of word vector conversion processing. Correspondingly, the first sub-database includes a first word vector sub-database corresponding to the word vector conversion processing and a first sentence vector sub-database corresponding to the sentence vector conversion processing, and the first word vector sub-database further includes at least two database partitions corresponding to the at least two types of word vector conversion processing.

The plurality of query manners may include vector querying (that is, the first query manner), tag querying (that is, the second query manner), and index querying (that is, the third query manner). The vector querying refers to converting the target query information corresponding to the query request into a vector form, and querying a vector conversion result corresponding to the first database (specifically, the first sub-database), to determine the query result by vector matching. The vector form may be specifically any form such as a word vector or a sentence vector. The tag querying refers to extracting tag information included in the target query information, and querying a tag marking result corresponding to the first database (specifically, the second sub-database), to determine the query result by tag matching. For example, tags may be pre-added to the data content in the first database for classification and identification, thereby improving query efficiency. The index querying refers to establishing a preset index for the first database (specifically, the third sub-database), thereby improving the query efficiency by using the index.

Specifically, the first query manner may be implemented in at least one of the following manners:

In a first example of the first query manner, the target query information included in the received query request is converted into a first target query vector by first word vector conversion processing, and a first database partition in the first word vector sub-database is queried according to the first target query vector, where the first database partition is obtained through first word vector conversion processing on the first service document (also referred to as a full service document). It can be learned that, in the manner, word vector conversion is performed on the first service document in the first database partition in the first word vector sub-database by using a first word vector conversion processing algorithm in advance, to obtain a first vector conversion result. Correspondingly, the target query information in the received query request is converted into the first target query vector by using the first word vector conversion processing algorithm, and the first target query vector is matched with the first vector conversion result in the first database partition, to obtain a first query sub-result.

In a second example, the target query information included in the received query request is converted into a second target query vector by second word vector conversion processing, and a second database partition in the first word vector sub-database is queried according to the second target query vector, where the second database partition in the first word vector sub-database is obtained through second word vector conversion processing on the first service document. It can be learned that, in the manner, word vector conversion is performed on the first service document by using a second word vector conversion processing algorithm in advance, to obtain a second vector conversion result. Correspondingly, the target query information included in the received query request is converted into the second target query vector by using the second word vector conversion processing algorithm, and the second target query vector is matched with the second vector conversion result in the second database partition, to obtain a second query sub-result. A main difference between the manner and the first example lies in that different word vector conversion processing algorithms are used, so that different logical associations between words can be dug out by using the different word vector conversion processing algorithms.

In a third example, the target query information included in the received query request is converted into a third target query vector by sentence vector conversion processing, and the first sentence vector sub-database is queried according to the third target query vector, where the first sentence vector sub-database is obtained through sentence vector conversion processing on the first service document. It can be learned that, in the manner, sentence vector conversion is performed on the first service document in the first sentence vector sub-database by using a sentence vector conversion processing algorithm in advance, to obtain a sentence vector conversion result. Correspondingly, the target query information included in the received query request is converted into the third target query vector by using the sentence vector conversion processing algorithm, and the third target query vector is matched with the sentence vector conversion result in the first sentence vector sub-database, to obtain a third query sub-result. A main difference between the manner and the foregoing two examples lies in that the sentence vector conversion processing algorithm different from the word vector conversion processing algorithms is used, thereby facilitating digging out a logical association between sentences.

In addition, the second query manner may be specifically implemented in the following manner: performing named entity recognition on the target query information included in the received query request, to obtain the entity tag corresponding to the target query information, and querying the second sub-database by tag querying, where the second sub-database is obtained by adding the entity tag to the first service document. The entity tag may be determined through named entity recognition. Specifically, named entity recognition may be performed on the first service document, to obtain knowledge graph features in the first service document, for example, an entity, an attribute, and a relationship, thereby improving the query efficiency by using a knowledge graph.

In addition, the third query manner may be specifically implemented in the following manner: querying the third sub-database by index querying according to the target query information included in the received query request, where the third sub-database is obtained based on the distributed index created by the distributed search engine. For example, an ES index generation engine may be invoked by using an index generation technology of Elastic Search, to directly create an index for generating the Elastic Search, thereby implementing quick and accurate querying by using the index.

In summary, a multi-way recall effect can be implemented in the plurality of query manners, thereby avoiding an incomplete recall result caused by single-way recall.

Operation S120: Query a second database according to the query request to obtain a second query result when the first query result does not meet a preset check condition.

The preset check condition is configured for determining whether the first query result meets a service requirement. To be specific, the preset check condition is configured for determining whether a valid query result is queried in operation S110. If the valid query result is not queried in operation S110, the second query result is further obtained through the second database in the operation.

Specifically, the preset check condition may be flexibly set by a person skilled in the art according to an actual service scenario. For example, the preset check condition is configured for checking whether the first query result is null. If the first query result is null, it is determined that the preset check condition is not met. If the first query result is non-null, it is determined that the preset check condition is met.

The second database may also be referred to as a short-term database, to store service data newly generated recently. Because the second database can be updated in real time when a service document is newly added, real-time performance of data content in the second database is high.

In some examples, the second database includes a vector database and a document database, and the vector database is associated with the document database through an index file. In an example, the method may further include the following operations: adding, to the document database, a second service document generated within a current time period; and slicing the second service document generated within the current time period, to obtain a plurality of document slices, and storing a plurality of slice vectors corresponding to the plurality of document slices in the vector database. The second service document may also be referred to as an incremental service document, to store document content newly added within the current time period. In this disclosure, system time is divided into a plurality of time periods according to preset period duration, so that a time period to which a system time point at which the current query request is received belongs is used as the current time period. For example, when the preset period duration is 24 hours (that is, the period is measured in days), the current time period is determined according to a date (an $X^{th}$ day of an $X^{th}$ month) to which the system time point at which the current query request is received belongs. Correspondingly, a plurality of time periods before the current time period may be collectively referred to as historical time periods, that is, a plurality of time periods before the $X^{th}$ month are all referred to as historical time periods. It can be learned that, in the storage manner, original content of the document is stored in the document database, the slice vectors corresponding to the document slices are stored in the vector database, and an association relationship between the two databases is established through the index file. Correspondingly, the second database is queried in the following manner: querying the vector database according to vector information corresponding to the target query information included in the query request, to obtain a second vector query result; and obtaining, according to the index file, a second document query result corresponding to the second vector query result from the document database. In a vectorization representation process, a correlation between slices can be better dug out by using a vector generation algorithm. Therefore, a query effect can be improved though querying by using vectors.

Operation S130: Generate a target query result corresponding to the query request according to the second query result.

In the operation, the target query result corresponding to the target query information may be generated according to the first query result and/or the second query result.

The second database is configured to store the second service document generated within the current time period, and has high real-time performance, to store incremental document data generated in a short term. The first database is configured to store the first service document generated within a historical time period, and the first service document may also be referred to as the full service document. For example, after processing such as deduplication and check is performed on a plurality of service documents generated within a plurality of historical time periods, the plurality of service documents are persisted in the first database, so that full document data valid in a long term is stored in the first database. In addition, because the first database is configured to store the full data, the amount of data is large, and update duration is long. Therefore, to reduce consumption of system resources, the first database may be updated periodically, for example, once a day, a week, or a month. Because the second database is configured to store the incremental data, the amount of data is small, and update duration is short. Therefore, to ensure real-time performance, the second database is dynamically updated in real time. For example, an update operation of the second database is triggered after an incremental document changes. It can be learned that, an update frequency of the second database is higher than an update frequency of the first database.

In the data query method provided in this embodiment of the present disclosure, a first database is first queried according to target query information, and a second database is further queried when a query result does not meet a preset check condition, where the second database is configured to store a second service document (that is, an incremental service document) generated within a current time period; the first database is configured to store a first service document (that is, a full service document) generated within a historical time period; and an update frequency of the second database is higher than an update frequency of the first database. It can be learned that, the first database is configured to store long-term data. Because the long-term data is more comprehensive, comprehensiveness and consistency of data are ensured. The second database is configured to store short-term data. Because the short-term data has a higher update frequency, better real-time performance is ensured, and document content that has just been generated recently can be fully covered. Generally, the first database has a larger amount of information and more comprehensive content. Therefore, the first database is first queried, to facilitate quickly obtaining a comprehensive query result. In addition, when a first query result of the first database does not meet the preset check condition, it indicates that appropriate data cannot be queried in the first database currently. In this case, to expand a query range so that recently generated data content can be queried in time, the second database is further queried. Data stored in the second database is recently generated and has not been synchronized to the first database. Therefore, accuracy and real-time performance of data can be considered through complementation of the two databases, thereby improving data query efficiency, and facilitating implementing comprehensive and accurate query processing.

In addition, a person skilled in the art can also make various modifications and variations to the method in this disclosure.

In an example, to more accurately identify query information, the target query information may be obtained in the following manner: obtaining key information included in the query request; and determining a plurality of preceding query requests having an association relationship with the query request, and processing the key information included in the query request according to key information included in the plurality of preceding query requests, to obtain the target query information. In an example, the key information included in the current query request may be obtained by using a generative large model; and the plurality of preceding query requests having the association relationship with the query request are determined, the key information included in the plurality of preceding query requests is obtained, and the key information included in the query request is processed, to obtain the target query information. The plurality of preceding query requests having the association relationship with the current query request are a plurality of query requests continuously triggered before the current query request, which may generally include: a plurality of query requests continuously triggered by a same user, or a plurality of query requests continuously triggered for a same question, or a plurality of query requests continuously triggered within preset duration. In summary, there is usually a logical association between the plurality of preceding query requests and the current query request. Therefore, accuracy of the key information can be improved by using the plurality of preceding query requests. Correspondingly, in operation S130, the target query result corresponding to the target query information may be generated in the following manner: inputting the second query result into the generative large model, and generating the target query result corresponding to the target query information in the query request by using the generative large model. Intellectual processing can be performed on the second query result by using the generative large model, to obtain the target query result more in line with the expression habit.

In an example, the method further includes: when the first query result is null, or when check information included in the first query result does not match check information included in the target query information, determining that the first query result does not meet the preset check condition, the check information including timestamp information. It can be learned that, that the first query result does not meet the preset check condition may include at least one of the following two cases:

In a first case, when the first query result is null, it is determined that the first query result does not meet the preset check condition. In other words, if a result meeting the requirement is not queried in the first database, querying needs to be further performed based on the second database.

In a second case, when the check information included in the first query result does not match the check information included in the target query information, it is determined that the first query result does not meet the preset check condition. It can be learned that, the manner aims to determine, based on the check information, whether the query result is an expected result. The check information may include the timestamp information. For example, a query condition includes timestamp information at specified time, and correspondingly, the query result also needs to include timestamp information at corresponding time. If the timestamp information in the query condition is inconsistent with the timestamp information in the query result, it indicates that the result meeting the requirement is not queried in the first database, and querying needs to be further performed based on the second database.

In an example, the query method in this embodiment is applied to an intelligent question answering scenario. Correspondingly, the target query information is configured for representing question information in the question answering scenario, and the target query result is configured for representing answer information in the question answering scenario. Specifically, the timestamp information included in the target query information may be obtained in the following manner: obtaining time information included in the query request, and performing format conversion processing on the time information, to obtain the timestamp information included in the target query information. Through format conversion processing, time in a non-standard form can be converted into time in a standard form, thereby facilitating matching and determining. For example, relative time such as "today" and "tomorrow" may be converted into absolute time in a form of a specific date.

In an example, the method further includes: updating, when incremental service content generated within the current time period is detected, the second service document in the second database according to the incremental service content generated within the current time period. It can be learned that, after the incremental service document generated within the current time period is detected, the second database is updated according to the incremental service content generated within the current time period. In addition, when it is detected that a preset update period is reached, the second service document generated within the current time period is compared with the first service document stored in the first database, and the first service document stored in the first database is updated according to a result of the comparison. It can be learned that, after it is detected that the preset update period is reached, the incremental service document generated within the current time period is compared with the full service document stored in the first database, and the full service document stored in the first database is updated according to the result of the comparison. It can be learned that, different update policies are set for the two databases, so that the second database can be updated in real time, thereby ensuring real-time performance of data. In addition, through a periodic comparison function of the first database, consistency and accuracy of the data can be ensured, and unnecessary system resource overheads caused by frequent updating of the first database can also be avoided. A period length of the update period may be the same as the preset period duration described above. Correspondingly, after it is detected that period duration of the current time period is reached, the second service document generated within the current time period is compared with the first service document stored in the first database, and the first service document stored in the first database is updated according to the result of the comparison.

For case of understanding, technical details in the foregoing embodiment are described below by using an example.

This example is mainly used to implement a knowledge question answering method inside an enterprise. In a modern enterprise, a digital enterprise knowledge base usually exists in a form of software or an online platform, which supports functions such as search, classification, and version control, and implements more intelligent knowledge retrieval and recommendation services based on an artificial intelligence natural language processing technology. Establishment of the enterprise knowledge base has at least the following advantages: (1) knowledge accumulation and inheritance: Scattered knowledge inside the enterprise is systematically sorted, to ensure that key experience and skills are inherited, and reduce a knowledge loss caused by personnel flow. (2) Efficiency improvement: An employee can conveniently and quickly search for required information, thereby improving work efficiency and reducing repeated labor. (3) Enterprise culture construction: Facilitate team collaboration through knowledge sharing, and enhance a learning atmosphere and innovation capabilities of the enterprise. However, during construction of a conventional enterprise knowledge base system, the following problems may be faced: (1) High knowledge obtaining and sorting costs: The knowledge inside the enterprise is widely distributed and in diverse forms, including documents, reports, emails, meeting records, and the like. Therefore, it is a time and labor-consuming task to collect such scattered and unstructured knowledge and perform systematic classification and sorting. (2) High difficulty in updating and maintenance: Knowledge content such as service procedures and product information of the enterprise, and policies and regulations is continuously updated with changes in internal and external environments. Therefore, maintaining real-time performance of content of the knowledge base is a continuous challenge. (3) Poor user experience and participation: The conventional knowledge base system may be insufficient in understanding an intention of a user, searching for a related answer, and the like, and required knowledge cannot be quickly and accurately positioned, reducing actual utility of the knowledge base and active participation and use of the employee.

To overcome the foregoing problems, in a related art, enterprise knowledge is extracted into structured data. A typical technical solution includes: manually extracting knowledge and converting the knowledge into structured data storable in a knowledge graph, and then using and querying the structured data. The knowledge graph is a structured data expression, which mainly includes three data types: (1) Entity: It is a basic element in the knowledge graph, and may be a specific object, for example, an employee or an office location; or may be an abstract concept. (2) Attribute: Each entity may have a plurality of attributes. For example, an employee entity may have attributes such as a name, a birth date, and a work department. (3) Relationship: Entities are connected through a clear relationship, for example, "affiliated to a department", or "reported to". The construction of the enterprise knowledge base system by using the knowledge graph usually requires the following operations: (1) Design a knowledge model, define entities (for example, companies, personnel, products, and projects) and relationship types (for example, affiliated to, providing services to, and participating in development) between the entities, and select an appropriate knowledge graph database for storage and management. (2) Extract key entities, attributes, and relationships from unstructured text, and usually perform entity type recognition, inter-entity relationship digging, and the like by using a named entity recognition (NER) tool or a custom rule. (3) Organize the entities and the relationships into a triplet (Subject-Predicate-Object) form, and construct a graph model. (4) Manually check accuracy of data, merge duplicate entities to ensure entity uniqueness, and check the extracted entities, attributes, and relationships to ensure no conflict with entity relationships in an existing knowledge base. (5) Periodically update content of the knowledge base with the development of enterprise services, and monitor and optimize the content, to ensure real-time performance and availability of the knowledge base.

However, construction and management of the enterprise knowledge base by using the knowledge graph also have some challenges and disadvantages. Correspondingly, the foregoing related art has at least the following defects: (1) Construction of an industry/enterprise-level knowledge graph requires a large amount of early investment and high labor costs, including data integration, cleaning, model design, algorithm development, and the like. In addition, internal data of the enterprise is widely distributed, and service logic and expertise in various specific fields often need to be deeply understood. In this way, it is difficult to ensure quality and consistency of data, and even external authoritative data sources need to be introduced to complement and verify the internal data. (2) In a data extraction process, technologies such as natural language processing and artificial intelligence are highly relied on to implement knowledge extraction and inference. However, the technologies are not perfect, and inevitably have various errors. As a result, inaccurate or misleading information appears in the knowledge graph. The knowledge graph is very sensitive to inaccurate internal data or noise in data. (3) Maintenance and updating of the knowledge graph are a long-term task, and require continuous personnel input and support. In addition, real-time capturing and updating of dynamically changing knowledge inside the enterprise is a technical difficulty. Particularly, when a data source quickly changes, storage, query performance, and update efficiency of the knowledge graph are challenged.

In still another related technology, intelligent question answering is implemented by constructing a question answering-based system. Such a semi-structured data structure is configured for representing an enterprise knowledge base, to provide more convenient interactive knowledge querying to users inside the enterprise. The question answering system mainly summarizes, generalizes, and sorts enterprise knowledge into a form of many question-answer pairs, then accepts a question posed by a user, performs similarity retrieval and matching between the question posed by the user and existing questions in the knowledge base, and directly uses, for a successfully matched question, an answer corresponding to the question in the knowledge base as an output result. When the enterprise establishes an efficient and intelligent question-answer knowledge base system, the following operations are generally included: (1) Collect content such as enterprise-related documents, manuals, FAQs, policies, and regulations, classify the content according to dimensions such as service modules, product lines, and service procedures, analyze questions that may be posed by users, and sort the content into a semi-structured format such as "question-answer pairs". (2) Import sorted knowledge entries into the question answering system, to form a preliminary knowledge base. (3) For questions in the "question-answer pairs", automatically generate "similar questions" by using an NLP algorithm, and also store the similar questions in the knowledge base, to facilitate subsequent understanding and retrieval matching by the question answering system. (4) Train a model of the question answering system according to content of the knowledge base, to recognize and understand a user question and provide an accurate answer; and configure a rule engine, and formulate logical determining and question answering paths, to provide an accurate matched answer. (5) Periodically update and maintain the content of the knowledge base according to an actual user question situation and continuous updating of the enterprise knowledge base, to improve an inaccurate answer, and ensure timeliness and accuracy of questions and answers.

It can be learned that, a main advantage of the enterprise knowledge base in the manner of the "question-answer pairs" is to facilitate an employee to quickly search for and understand required information. However, the foregoing manner may also have the following defects: (1) High information maintenance costs: Although the "question-answer pairs" are a flexible semi-structured information organization manner, knowledge is fragmented and lacks systematic and global performance, resulting in a large amount of repeated, conflicting, or even contradictory knowledge and information inside the knowledge base, and affecting quality of output answers. If such data noise needs to be completely cleared, high labor is required for content review, updating, and the like. (2) Not timely information updating: If service procedures or policies of the enterprise change, questions and answers in the knowledge base may not be updated in real time, resulting in a lag or an error in information obtained by the employee. (3) Limited intelligence: Although some advanced knowledge base systems have natural language processing capabilities, most cannot completely replace manual answering. Particularly, when complex, variable, or fuzzy query requests are processed, understanding and matching difficulties may exist, and personalized requirements of all users cannot be met.

It can be learned that, the foregoing manner cannot consider real-time performance and accuracy of data content. To resolve the foregoing problems, in this example, a data query method implemented based on a long-term memory database and a short-term memory database is provided. The long-term memory database is an example of the first database described above, and the short-term memory database is an example of the second database described above.

Figure 2:
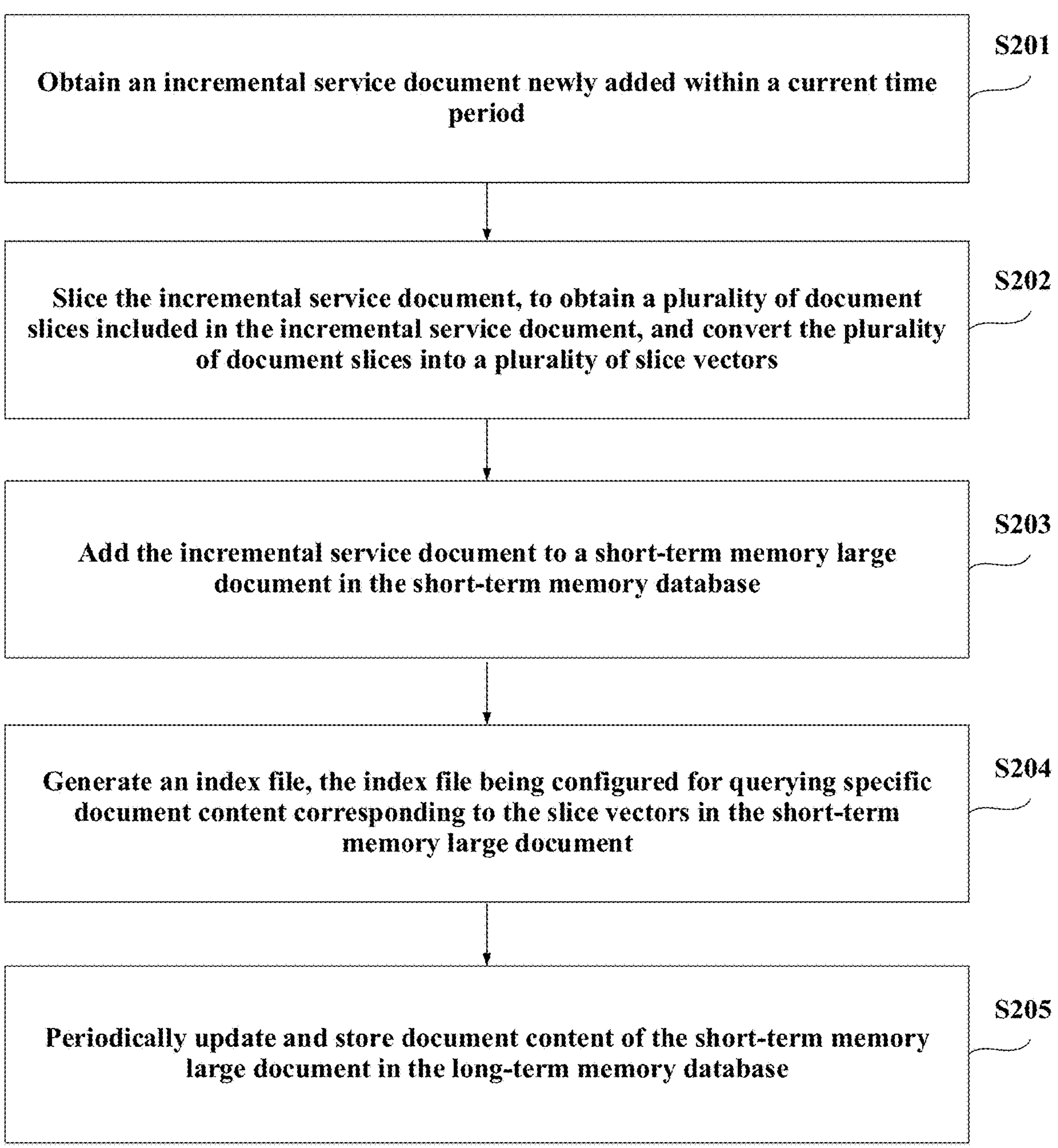
FIG. 2 is a schematic diagram of an example of a process of generating a short-term memory database.

FIG. 2 is a schematic diagram of a process of generating a short-term memory database. As shown in FIG. 2, the short-term memory database is generated through the following operations.

Operation S201: Obtain an incremental service document newly added within a current time period.

Specifically, the newly added incremental service document may be a new document recently uploaded by a user. Correspondingly, when a document addition operation or a document update operation is detected, the newly added incremental service document is obtained in real time.

Operation S202: Slice the incremental service document, to obtain a plurality of document slices included in the incremental service document, and convert the plurality of document slices into a plurality of slice vectors.

Specifically, the incremental service document may be first pre-processed, for example, irrelevant characters, punctuation marks, and stop words are removed, and meaningful words or phrases are retained. Next, a pre-processed document is cut into a plurality of small segments, namely, slices. One slice may be one statement, one paragraph, or document content with a fixed length (for example, 150 tokens). Then, for a slice of each small segment, each slice is mapped into a vector of a fixed dimension by using a pre-trained vector conversion model. In this way, each document slice has a corresponding vector representation (that is, a slice vector). Through vectorization processing, an association relationship between a plurality of slices can be dug out, thereby facilitating a subsequent query operation.

Operation S203: Add the incremental service document to a short-term memory large document in the short-term memory database.

The new incremental service document is appended to the document end of the short-term memory large document. It can be seen that, the short-term memory large document is configured to store document content of each incremental service document within the current time period. The short-term memory large document is an example of the second service document described above, and the short-term memory database is an example of the second database described above.

Operation S204: Generate an index file, the index file being configured for querying specific document content corresponding to the slice vectors in the short-term memory large document.

Specifically, the slice vector corresponding to each document slice in the incremental service document is used as a data item, and metadata (such as a document ID and slice location information) of the slice vector is associated with the data item, to create the index file. Through the index file, a document ID and slice location information corresponding to a slice vector can be quickly positioned, thereby quickly determining document content corresponding to the slice vector. The vectors and metadata thereof are inserted into a vector database storing the "short-term memory" document. In this way, the knowledge newly inputted in the document form is successfully added to knowledge of the "short-term memory" document, and can be configured for questioning, answering, and querying. A purpose of vectorization conversion is as follows: For semantic matching between a question and an answer, matching in a vector space is more accurate. For example, a question space and an answer space may not have a high matching degree in terms of keywords, but have a high matching degree in terms of vectors. For example, it is assumed that a question is "a previous work unit of a director of an XX company", and there is a resume of a director * of the XX company in the original text. Through learning of the vector conversion model, vectors of "*" and "the director of the XX company" in the vector space are very close to each other. Therefore, an associated word can be accurately queried by vector querying.

Operation S205: Periodically update and store document content of the short-term memory large document in the long-term memory database.

For example, after it is detected that a preset update period is reached, the incremental service document generated within the current time period is compared with the full service document stored in the first database, and a full service document stored in the long-term memory database is updated according to a result of the comparison. The long-term memory database is an example form of the first database described above.

Figure 3:
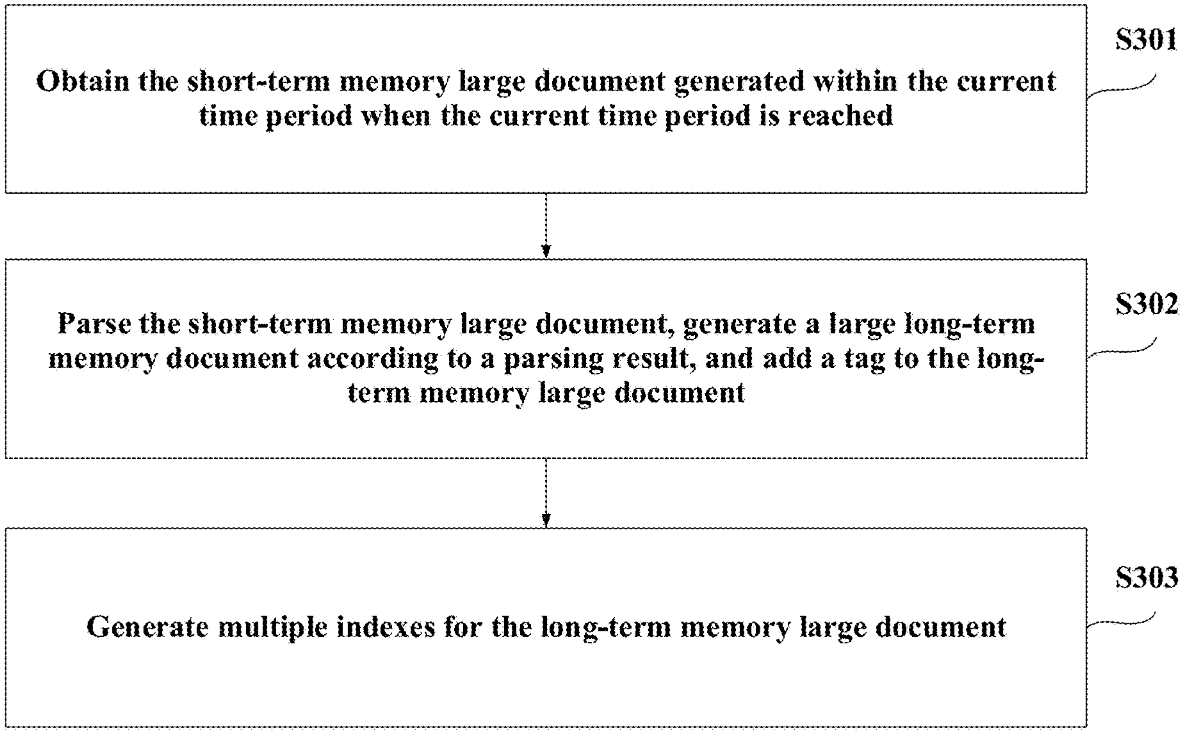
FIG. 3 is a schematic diagram of an example of a process of updating a long-term memory database according to a short-term memory database.

FIG. 3 is a schematic diagram of a process of updating a long-term memory database according to a short-term memory database. As shown in FIG. 3, the long-term memory database is generated through the following operations.

Operation S301: Obtain the short-term memory large document generated within the current time period when the current time period is reached.

Operation S302: Parse the short-term memory large document, generate a long-term memory large document according to a parsing result, and add a tag to the long-term memory large document.

Knowledge in the "short-term memory" needs to be uniformly updated to the "long-term memory" every day. Because knowledge stored in the long-term memory is more accurate, and more attention is paid to global consistency, the process is a more complex processing process. Specifically, the long-term memory large document is generated according to the parsing result of the short-term memory large document. For example, the parsing result of the short-term memory large document may be added to the end of the long-term memory large document.

In a process of generating the long-term memory large document according to the parsing result of the short-term memory large document, entities in the document may be marked into different entity types through named entity recognition (NER). In an enterprise knowledge base, common entity types include a person name, an organization, an event, an activity, and the like. After the entities are marked, description information related to the entities may further continue to be extracted from the short-term memory large document by using different preset templates, to be used as attributes of the entities, including a date, a procedure, and the like. For different entities and attributes, corresponding tags are generated at beginnings and ends of the different entities and attributes in the document and are added to corresponding locations in the document.

In addition, in the operation, a deduplication operation may be further performed: For to-be-added content in the short-term memory large document, it is queried whether entity or entity attribute information the same as the content has existed in the long-term memory large document. If the entity or entity attribute information the same as the content has existed in the long-term memory large document, a replacement task is generated for manual review, which includes a replacing part and a replaced part. After the manual review succeeds, the original entity or entity attribute information is replaced with the new content in the long-term memory large document. If the entity or entity attribute information the same as the content has not existed in the long-term memory large document, the new document content added with a tag is appended to the end of the long-term memory large document. It can be learned that, when a repetition may exist, the repetition can be avoided through manual review, thereby improving content accuracy.

Operation S303: Generate multiple indexes for the long-term memory large document.

For the newly generated "long-term memory large document", the multiple indexes are generated, to reduce missing recall of a valid answer to a question caused by a single index. The multiple indexes may include the following five types:

(1) Tag index (corresponding to the second query manner described above): A whole-word index of "entity" and "entity-attribute" based on a tag. A purpose of the index is to perform, for an entity name or an entity-attribute name involved in a question, accurate recall through strict matching. In the manner, query efficiency is improved by using an entity tag.

(2) First word vector-based index (corresponding to one manner of the first query manner described above): Also referred to as slice-based vector recall. Vectors are generated through slices. A Chinese vector model for BAAI general embedding (BGE) is first used for word-level vector generation, and then an overall average of all words is used as a vector of a whole slice.

(3) Second word vector-based index (corresponding to one manner of the first query manner described above): Essentially, the second word vector-based index is also slice-based vector recall. Specifically, another open source word vector generation manner is used, such as a Stella open source base version, and then an overall average of all words is used as a vector of a whole slice.

(4) Sentence vector-based index (corresponding to one manner of the first query manner described above): Essentially, the sentence vector-based index is also slice-based vector recall. Sentence-level vector encoding is used. A BERT model is used for each sentence to generate sentence embedding, and then a sum of embedding of all sentences of the segment is used as a vector of a whole slice.

(5) Elastic Search-based index (corresponding to the third query manner described above): A fifth manner of generating an index of a segment refers to invoking an ES index generation engine by using an index generation technology of Elastic Search, to directly create an index for generating the Elastic Search. The Elastic Search is a document search engine that supports matching and recall of a plurality of keywords.

Multi-way recall can be implemented through the multiple indexes, thereby improving comprehensiveness of querying. It can be learned that, the plurality of index manners described above are examples of the plurality of query manners described above.

Figure 4:
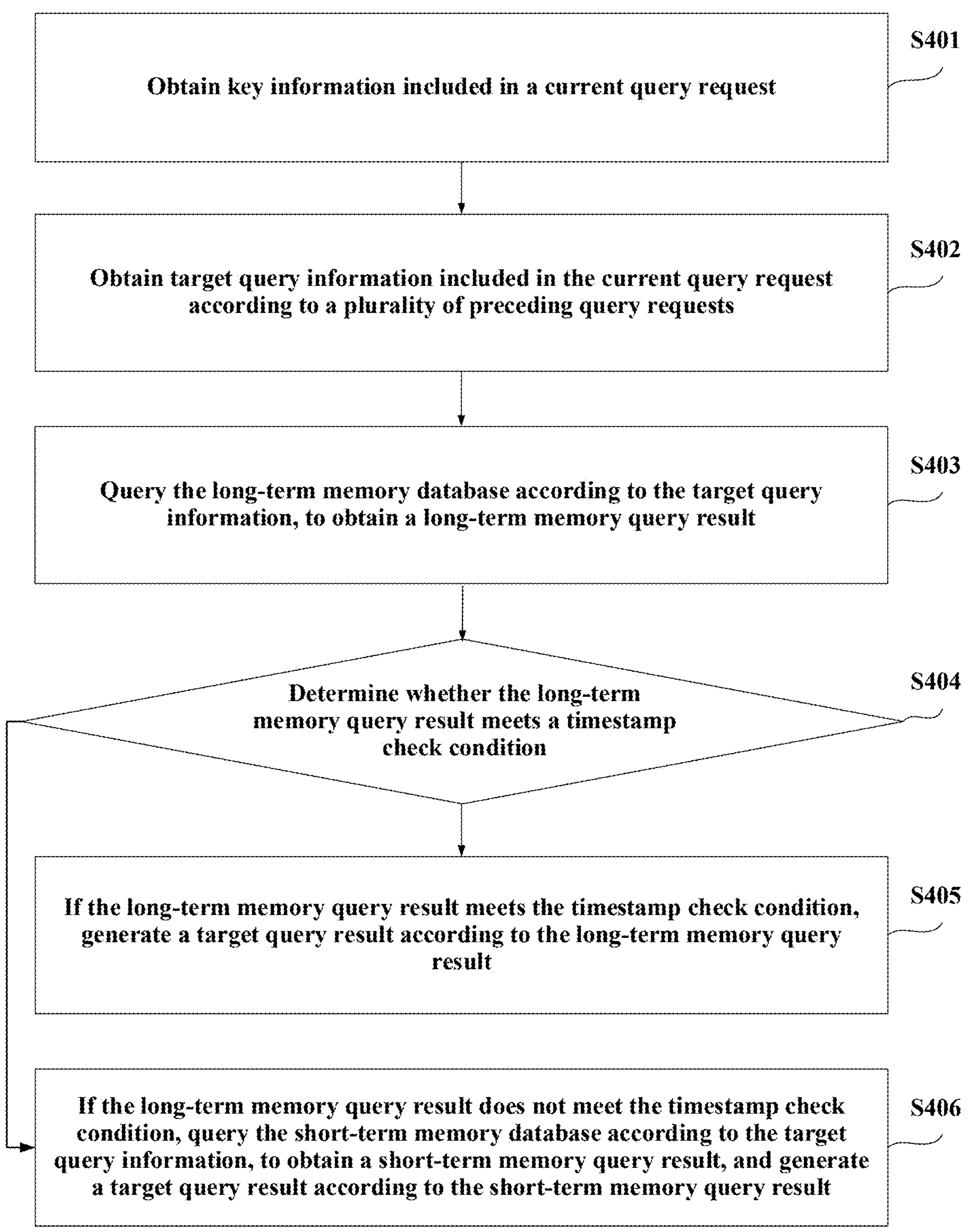
FIG. 4 is a schematic flowchart of a data query method in an example.

FIG. 4 is a schematic flowchart of a data query method in an example. As shown in FIG. 4, the data query method includes the following operations.

Operation S401: Obtain key information included in a current query request.

Operation S402: Obtain target query information included in the current query request according to a plurality of preceding query requests.

When the user poses a question that needs assistance in a plurality of rounds of dialogs, the target query information included in the current query request is determined in the following manner: First, conversion processing is performed on a pronoun included in the current query request, to convert the pronoun into a clear reference object. For example, a plurality of rounds of anaphora resolution may be implemented according to context: If a question of the user in a current round includes a pronoun or another ambiguous noun, a specific entity in a previous dialog that the pronoun or another ambiguous noun actually refers to is recognized by using a generative large model according to context information and semantic understanding.

Then, according to the generative large model, a completion operation on content of the question of the user may further be performed, and rewriting of the question may be implemented. For example, key information in a plurality of previous rounds of dialogs may be extracted and used as a part of prompts of the current round of dialog, to complete information for the question in the current round. An answer can be retrieved more accurately through the completed question.

The question may also be completed by using a chain of thought function of the generative large model. For example, for a question in which the user does not express clear and complete information, intention of the user is first determined, and then self-asking and self-answering are performed by using the large model and are repeated a plurality of times, to form a text structure similar to a chain of thought and add the text structure to the prompts. In the manner, missing information is completed to a certain extent.

Operation S403: Query the long-term memory database according to the target query information, to obtain a long-term memory query result.

After the question is completed and relevant prompts are generated, multi-way recall is performed in the long-term memory database by using the prompts. A multi-way recall policy corresponds to a multi-index policy described above. Finally, top 5 results that are most relevant are selected from all multi-way recall results, to be used as final multi-way recall results. Through the multi-way recall, comprehensiveness of querying can be improved. The long-term memory query result is the first query result described above.

Operation S404: Determine whether the long-term memory query result meets a timestamp check condition.

A timestamp may be formed by determining whether the question includes time information. The time information may be explicit, for example, "In 20XX"; or may be implicit, for example, "this year" or "this month". If the time information is implicit, the time information needs to be converted into clear time information. Finally, the time information is converted into a timestamp in a uniform format, which is used as an important part in the question and is extracted separately. If the original question includes the time information, it needs to be determined whether the long-term memory query result meets the timestamp check condition. If the long-term memory query result does not meet the timestamp check condition, operation S406 is performed. If the long-term memory query result meets the timestamp check condition, operation S405 is performed.

Operation S405: If the long-term memory query result meets the timestamp check condition, generate a target query result according to the long-term memory query result.

Specifically, a plurality of recall result segments in the multi-way recall results are accurately arranged, and a final target query result is obtained by using the generative large model.

Operation S406: If the long-term memory query result does not meet the timestamp check condition, query the short-term memory database according to the target query information, to obtain a short-term memory query result, and generate a target query result according to the short-term memory query result.

Recall is performed according to slice vectors in the short-term memory large document. If there is a recall result meeting the timestamp, a final answer is generated by using the large model. If there is no recall result meeting the timestamp, a rejection reply is generated based on that the time condition is not met. It can be learned that, in the foregoing process, a new question and a prompt may be inputted into the large model, and the large model understands and digests the information, and generate a final answer according to the information. The short-term memory query result is the second query result described above.

Figure 5:
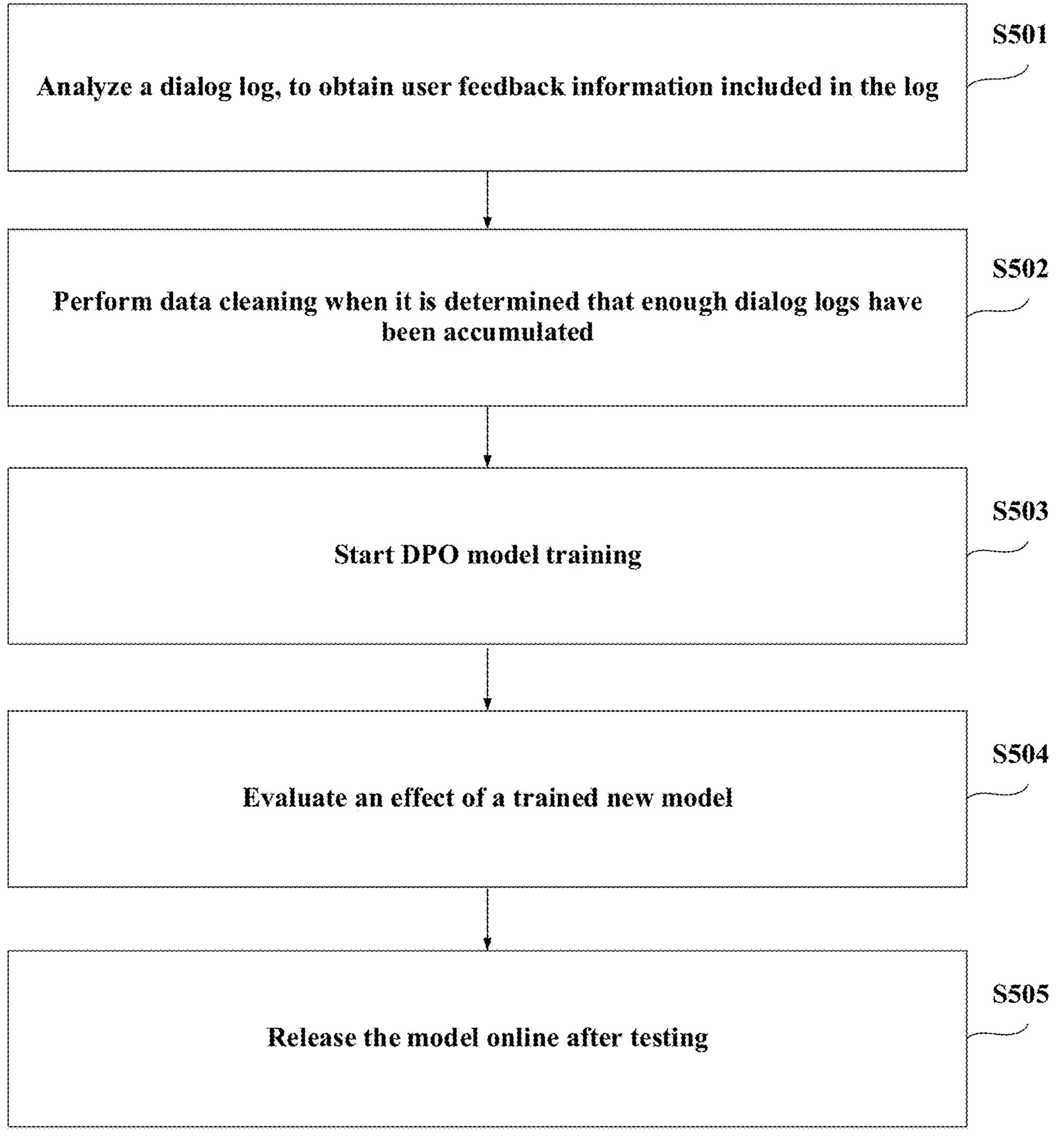
FIG. 5 is a schematic diagram of an example of a process of training a generative large model.

FIG. 5 is a schematic diagram of a process of training a generative large model. As shown in FIG. 5, the process of training the generative large model includes the following operations.

Operation S501: Analyze a dialog log, to obtain user feedback information included in the log.

The user feedback information includes a feedback signal of a system, which is mainly from analysis of the system on the dialog log. The user feedback information includes direct feedback of a user: like and unlike; and indirect feedback of the user: whether to repeatedly pose a same question a plurality of times, whether to perform a copy operation on an answered answer, and the like. The feedback may be used to determine whether a generated answer is accepted by the user and meets a preference of the user.

Operation S502: Perform data cleaning when it is determined that enough dialog logs have been accumulated.

It is determined whether collected feedback data is sufficient for "continuous training" once, and a criterion for the determining is whether a total amount of data reaches at least 200. 200 is selected as a threshold because the value is approximately a quantity of samples in training samples of 20 batches, which has a certain guarantee on stability of a result of each training. In addition, data cleaning is performed on all data samples for "continuous training" once, and main operations include: processing a missing value, an abnormal value, and a duplicate value, removing irrelevant and redundant fields, unifying a data format, detecting data consistency, and performing necessary data conversion.

Operation S503: Start DPO model training.

Model parameters are fine-tuned by using a distributional policy optimization (DPO) algorithm, to continuously improve a behavior or an output of the large model, so that the large model is more in line with user preferences or follows specific specifications.

Operation S504: Evaluate an effect of a trained new model.

After the model parameters are adjusted and trained, regression testing is performed on all previously accumulated difficult samples and erroneous samples by using the new model. If the new model makes an error on the samples again, it is proved that the new model parameters have a catastrophic forgetting phenomenon, and the samples need to be added to re-perform fine-tuning training.

Operation S505: Release the model online after testing.

Trial and effect check may be manually performed on the new model, and the final model is determined to be released online.

It can be learned that, FIG. 5 describes operations of continuous learning training of a large language model in a "knowledge document" system. As a core driving part of the entire system, how the large model collects various feedback signals and performs continuous adjustment, enhancement, and alignment according to the feedback signals is a key to determining whether the system can overcome a time degradation effect and truly become smarter through more use.

In summary, it can be learned that, related art defects that can be overcome and technical contributions in this example mainly include: (1) A disadvantage that construction of an industry/enterprise-level knowledge graph in a conventional manner requires a large amount of early investment and high maintenance labor costs is overcome. This solution provides a lightweight manner, where only text materials including answers related to questions that need to be answered need to be inputted, and no additional knowledge extraction of "entity-attribute-relationship" needs to be performed, thereby greatly alleviating an early labor requirement. (2) A structural mode in which a "short-term memory" and a "long-term memory" are separately stored is innovatively provided. In this way, a contradiction that update timeliness, accuracy, and consistency of content of a knowledge base cannot be simultaneously met is resolved, and an association relationship among the update timeliness, the accuracy, and the consistency is well balanced. (3) A strong representation learning capability, a strong generalization capability, and a good zero-sample learning capability of the large model are used, so that the entire system can perform better context understanding and a plurality of rounds of dialogs, instead of answering only a single round of question like a conventional knowledge question answering system. (4) Feedback training of "continuous learning" is performed on the large model by using a reinforcement learning method for optimizing policy model distribution such as DPO, so that the system can be smarter through more use, overcome a disadvantage that model performance of a general model system attenuates over time, and can perform well in a plurality of different tasks. (5) The large model and a vector database retrieval technology are combined, to support efficient similarity search through a vector database, and search for similarities through a cosine similarity or another distance measurement. In this way, a probability that the large model generates a "hallucination" error is reduced, and a requirement of the enterprise knowledge base for high accuracy of question answering can be met. (6) In this solution, both an input and an output are modularized. In addition to helping enterprise customization and private deployment, this solution can also be easily expanded and transformed into a SaaS service manner. (7) Because the system has a universal multi-round dialog capability, in addition to being an independent enterprise knowledge question answering system, the system can also be easily embedded into an existing HR system of a company, such as a training module for new employees, or a seat assistant of a large company for internal manual services.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

In summary, this example provides a lightweight enterprise knowledge question answering system, which can help an enterprise quickly construct a highly intelligent enterprise knowledge assistant with a multi-round question answering capability as an employee-oriented unified knowledge question answering system of the enterprise based on that labor much lower than that required for constructing a conventional knowledge base is invested, thereby improving work efficiency of employees of the enterprise, increasing a digital service degree of the enterprise, and increasing an application level of each functional department of the enterprise for latest AI technologies.

The foregoing method embodiments described in the present disclosure may be combined with each other to form a combined embodiment without departing from principle logic. Limited by space, details are not described in the present disclosure again. A person skilled in the art may understand that, in the foregoing examples, the steps are to be determined according to functions and possible internal logic of the operations.

In addition, the present disclosure further provides a data query apparatus, an electronic device, and a computer-readable storage medium, which can be used to implement any data query method provided in the present disclosure. For corresponding technical solutions and descriptions, reference is made to corresponding descriptions in the method part. Details are not described again.

Figure 6:
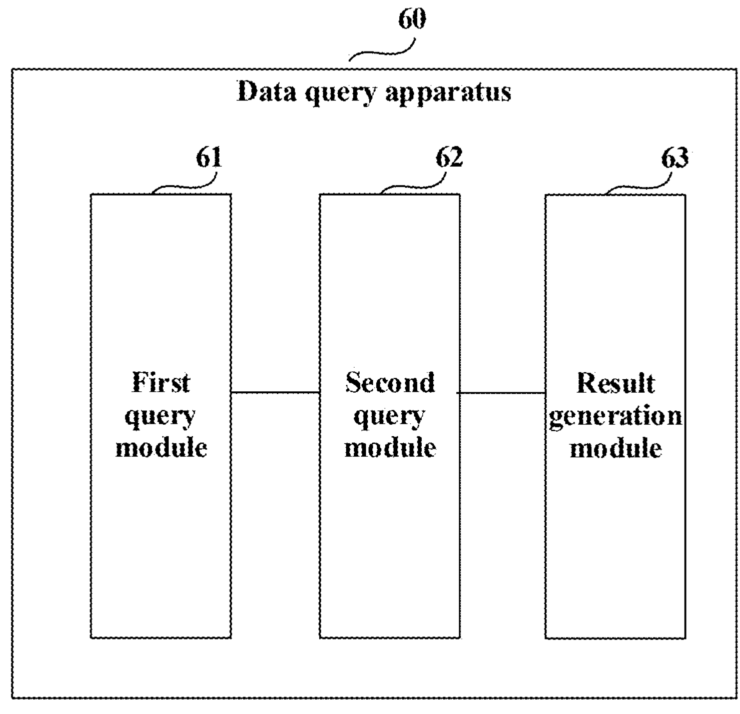
FIG. 6 is a block diagram of a data query apparatus according to an embodiment of the present disclosure.

FIG. 6 is a block diagram of a data query apparatus according to an embodiment of the present disclosure.

Referring to FIG. 6, an embodiment of the present disclosure provides a data query apparatus 60. The data query apparatus 60 includes:

a first query module 61, configured to query a first database to obtain a first query result in response to a received query request;

a second query module 62, configured to query a second database according to the query request to obtain a second query result when the first query result does not meet a preset check condition; and a result generation module 63, configured to generate a target query result corresponding to the query request according to the second query result, the first database being configured to store a first service document generated within a historical time period, and the second database being configured to store a second service document generated within a current time period; and an update frequency of the second database being higher than an update frequency of the first database.

In an example, the first query module is specifically configured to:

query a plurality of sub-databases corresponding to the first database in a plurality of query manners, to obtain a plurality of query sub-results; and merge the plurality of query sub-results, to obtain the first query result.

In an example, the plurality of query manners include at least two of the following:

a first query manner, configured to convert target query information included in the received query request into a target query vector by vector conversion processing, and query a first sub-database according to the target query vector, where the first sub-database is obtained through vector conversion processing on the first service document;

a second query manner, configured to perform named entity recognition on target query information included in the received query request, to obtain an entity tag corresponding to the target query information, and query a second sub-database by tag querying, where the second sub-database is obtained by adding an entity tag to the first service document; or a third query manner, configured to query a third sub-database by index querying according to target query information included in the received query request, where the third sub-database is obtained based on a distributed index created by a distributed search engine.

In an example, the second database includes a vector database and a document database, and the vector database is associated with the document database through an index file; the apparatus further includes:

a storage module, configured to add, to the document database, the second service document generated within the current time period; and slice the second service document generated within the current time period, to obtain a plurality of document slices, and store a plurality of slice vectors corresponding to the plurality of document slices in the vector database; and the second query module is specifically configured to:

obtain the target query information included in the query request, and query the vector database according to vector information corresponding to the target query information, to obtain a second vector query result; and obtain, according to the index file, a second document query result corresponding to the second vector query result from the document database.

In an example, the second query module is specifically configured to:

obtain key information included in the query request; and determine a plurality of preceding query requests having an association relationship with the query request, and process the key information included in the query request according to key information included in the plurality of preceding query requests, to obtain the target query information.

In an example, when the first query result is null, or when check information included in the first query result does not match check information included in the target query information, it is determined that the first query result does not meet the preset check condition, the check information including timestamp information.

In an example, the target query information is configured for representing question information in a question answering scenario, and the target query result is configured for representing answer information in the question answering scenario; and the second query module is specifically configured to:

obtain time information included in the query request, and perform format conversion processing on the time information, to obtain the timestamp information included in the target query information.

In an example, when incremental service content generated within the current time period is detected, the second service document in the second database is updated according to the incremental service content generated within the current time period; and when it is detected that a preset update period is reached, the second service document generated within the current time period is compared with the first service document stored in the first database, and the first service document stored in the first database is updated according to a result of the comparison.

The modules in the foregoing data query apparatus may be implemented entirely or partially by software, hardware, or combinations thereof. The foregoing modules may be built in or independent of a processor of a computer device in a hardware form, or may be stored in a memory of the computer device in a software form, so that the processor invokes and performs an operation corresponding to each of the foregoing modules.

Figure 7:
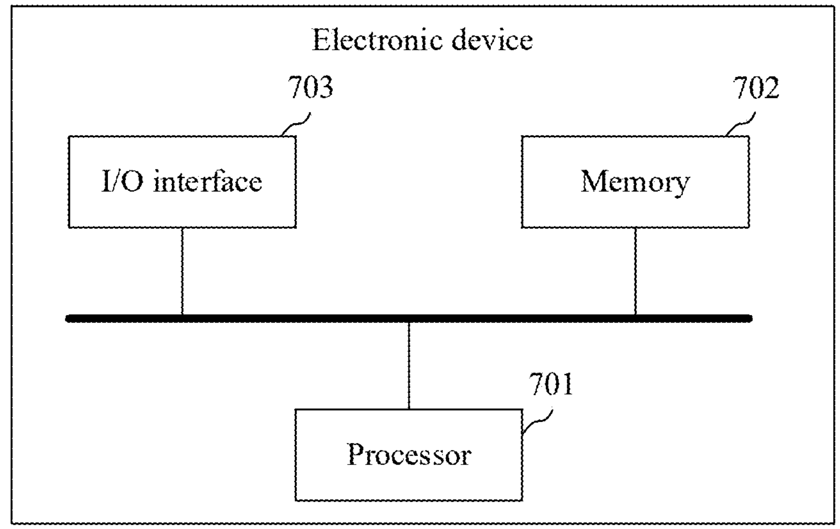
FIG. 7 is a block diagram of an electronic device according to an embodiment of the present disclosure.

FIG. 7 is a block diagram of an electronic device according to an embodiment of the present disclosure.

Referring to FIG. 7, an embodiment of the present disclosure provides an electronic device. The electronic device includes processing circuitry, such as at least one processor 701; at least one memory 702, such as a non-transitory computer-readable storage medium; and one or more I/O interfaces 703 connected between the processor 701 and the memory 702, the memory 702 having one or more computer programs executable by the at least one processor 701 stored therein, the one or more computer programs being executed by the at least one processor 701, to cause the at least one processor 701 to perform the foregoing data query method.

The modules in the foregoing electronic device may be implemented entirely or partially by software, hardware, or combinations thereof. The foregoing modules may be built in or independent of a processor of a computer device in a hardware form, or may be stored in a memory of the computer device in a software form, so that the processor invokes and performs an operation corresponding to each of the foregoing modules.

An embodiment of the present disclosure further provides a computer-readable storage medium, having a computer program stored therein, the computer program, when executed by a processor/processor core, implementing the foregoing data query method. The computer-readable storage medium may be a volatile or non-volatile computer-readable storage medium.

An embodiment of the present disclosure further provides a computer program product, including computer-readable code, or a non-volatile computer-readable storage medium carrying computer-readable code, when the computer-readable code is run in a processor of an electronic device, the processor of the electronic device performing the foregoing data query method.

A person of ordinary skill in the art may understand that, all or some steps in the methods, systems, and functional modules/units in the apparatuses disclosed above may be implemented as software, firmware, hardware, and a proper combination thereof. In an example, division between the functional modules/units described in the foregoing description does not necessarily correspond to division of physical components. For example, one physical component may have a plurality of functions, or one function or step may be cooperatively performed by a plurality of physical components. Some or all physical components may be implemented as software executed by a processor, such as a central processing unit, a digital signal processor, or a microprocessor, or may be implemented as hardware, or may be implemented as an integrated circuit, such as a special-purpose integrated circuit. Such software may be distributed on a computer-readable storage medium. The computer-readable storage medium may include a computer storage medium (or non-transitory medium) and a communication medium (or transitory medium).

As known to a person of ordinary skill in the art, the computer storage medium includes volatile and non-volatile media, and removable and non-removable media implemented by using any method or technology and configured to store information (such as computer-readable program instructions, a data structure, a program module, or other data). The computer storage medium includes, but is not limited to a random access memory (RAM), a read-only memory (ROM), an erasable programmable read-only memory (EPROM), a static random access memory (SRAM), a flash memory or another memory technology, a portable compact disc read-only memory (CD-ROM), a digital versatile disc (DVD) or another optical disc storage, a magnetic cassette, a magnetic tape, magnetic disk storage or another magnetic storage apparatus, or any other medium that can be used to store expected information and that can be accessed by a computer. In addition, it is well known to a person of ordinary skill in the art that, the communication medium usually includes computer-readable program instructions, a data structure, a program module, or other data in a carrier wave or a modulated data signal in another transmission mechanism, and may include any information delivery medium.

The computer-readable program instructions described herein may be downloaded to computing/processing devices from the computer-readable storage medium, or may be downloaded to an external computer or an external storage device from a network such as the Internet, a local area network, a wide area network, and/or a wireless network. The network may include a copper transmission cable, optical fiber transmission, wireless transmission, a router, a firewall, a switch, a gateway computer, and/or an edge server. A network adapter card or network interface in each computing/processing device receives the computer-readable program instructions from the network and forwards the computer-readable program instructions for storage in a computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages such as Smalltalk and C++; and conventional procedural programming languages such as a "C" language or a similar programming language. The computer-readable program instructions may be completely executed on a user computer, partially executed on a user computer, executed as an independent software package, partially executed on a user computer and partially executed on a remote computer, or completely executed on a remote computer or server. For the case involving a remote computer, the remote computer may be connected to a computer of a user through any type of network including a LAN or a WAN, or may be connected to an external computer (for example, through the Internet by using an Internet service provider). In some embodiments, an electronic circuit such as a programmable logic circuit, a field programmable gate array (FPGA), or a programmable logic array (PLA) is customized by using state information of the computer-readable program instructions. The electronic circuit can execute the computer-readable program instructions, to implement various aspects of the present disclosure.

The computer program product described herein may be specifically implemented by hardware, software, or a combination thereof. In an optional embodiment, the computer program product is specifically embodied as a computer storage medium. In another optional embodiment, the computer program product is specifically embodied as a software product, for example, a software development kit (SDK).

The various aspects of the present disclosure are described herein with reference to flowcharts and/or block diagrams of methods, apparatuses (systems), and computer program products according to the embodiments of the present disclosure. Each block of the flowcharts and/or block diagrams and combinations of blocks in the flowcharts and/or block diagrams can be implemented by the computer-readable program instructions.

The computer-readable program instructions may be provided to a processor of a general-purpose computer, a special-purpose computer, or another programmable data processing apparatus, to generate a machine. Therefore, the instructions, when executed via the processor of the computer or the another programmable data processing apparatus, generate an apparatus configured to implement functions/actions specified in one or more blocks of the flowcharts and/or block diagrams. Alternatively, the computer-readable program instructions may be stored in the computer-readable storage medium, and the instructions enable a computer, a programmable data processing apparatus, and/or another device to work in a specific manner. Therefore, the computer-readable medium having the instructions stored therein includes a product including instructions for implementing aspects of functions/actions specified in one or more blocks of the flowcharts and/or block diagrams.

Alternatively, the computer-readable program instructions may be loaded onto a computer, another programmable data processing apparatus, or another device, so that a series of operations and steps are performed on the computer, the another programmable data processing apparatus, or the another device, thereby generating a computer-implemented process. Therefore, the instructions executed on the computer, the another programmable data processing apparatus, or the another device implement functions/actions specified in one or more blocks of the flowcharts and/or block diagrams.

The flowcharts and block diagrams in the accompanying drawings illustrate system architectures, functions, and operations that may be implemented by a system, a method, and a computer program product according to a plurality of embodiments of the present disclosure. In this regard, each block in the flowcharts and/or block diagrams may represent a module, a program segment, or a part of an instruction. The module, the program segment, or the part of the instruction includes one or more executable instructions for implementing a specified logical function. In some examples used as substitutes, functions annotated in blocks may alternatively occur in a sequence different from that annotated in an accompanying drawing. For example, actually two consecutive blocks may be performed basically in parallel, and sometimes the two blocks may be performed in a reverse sequence. This is determined by a related function. Each block in the block diagrams and/or flowcharts, and a combination of blocks in the block diagrams and/or the flowcharts, may be implemented by using a specific hardware-based system that performs specified functions or actions, or may be implemented by using a combination of special-purpose hardware and computer instructions.

Examples of embodiments have been disclosed in this specification, and although specific terms are used, the terms are merely used for and are to be construed as general illustrative meanings, and are not intended to limit the present disclosure. In some instances, it is apparent to a person skilled in the art that, unless otherwise explicitly stated, features, characteristics, and/or elements described in combination with a specific embodiment may be used alone, or may be used in combination with features, characteristics, and/or elements described in combination with other embodiments. Therefore, a person skilled in the art will understand that, various changes in forms and details may be made without departing from the scope of the present disclosure.

What is claimed is:

1. A data query method, comprising:

obtaining a first query result of a first database in response to a query request, the first database storing data of a first time window;

obtaining a second query result of a second database when the first query result does not meet a preset check condition, the second database storing data of a second time window, a start time of the second time window being after a start time of the first time window; and generating, by processing circuitry, a target query result based on at least one of the first query result or the second query result, wherein an update frequency of the second database is higher than an update frequency of the first database;

the second database includes a vector database and a document database, associations between the vector database and the document database being indicated in an index file; and the method further comprises:

adding, to the document database, a second service document generated within the second time window;

slicing the second service document to obtain a plurality of document slices; and storing a plurality of slice vectors corresponding to the plurality of document slices in the vector database.

2. The method according to claim 1, wherein the obtaining the first query result comprises:

querying a plurality of sub-databases corresponding to the first database based on a plurality of first sub-queries, to obtain a plurality of first query sub-results; and merging the plurality of first query sub-results, to obtain the first query result.

3. The method according to claim 2, wherein the plurality of first sub-queries comprises at least two of:

i) a conversion of information included in the query request into a first target query vector by vector conversion, and a query of a first sub-database according to the first target query vector, the first sub-database being obtained through the vector conversion on a first service document stored in the first database;

ii) entity recognition in the query request, to obtain an entity, and a query of a second sub-database by tag querying, the second sub-database being obtained by adding an entity tag to the first service document; or iii) a query of a third sub-database by index querying according to the query request, the third sub-database being obtained based on a distributed index.

4. The method according to claim 1, wherein the obtaining the second query result further comprises:

obtaining target query information included in the query request;

querying the vector database based on vector information corresponding to the target query information, to obtain a vector query result; and obtaining, based on the index file, a second document query result corresponding to the vector query result from the document database.

5. The method according to claim 4, wherein the obtaining the target query information further comprises:

obtaining key information in the query request;

determining a plurality of preceding query requests having an association relationship with the query request; and processing the key information in the plurality of preceding query requests, to obtain the target query information.

6. The method according to claim 5, wherein, when the first query result does not meet the preset check condition, the first query result is null; or the first query result does not match check information in the target query information and the check information includes timestamp information.

7. The method according to claim 6, wherein the target query information includes question information in a question answering scenario, and the target query result includes answer information in the question answering scenario; and the method further comprises:

obtaining time information in the query request and performing format conversion on the time information to obtain the timestamp information.

8. The method according to claim 1, wherein the method further comprises:

updating, when incremental service content generated within the second time window is detected, a second service document in the second database according to the incremental service content generated within the second time window;

comparing, when a preset update period is reached, the second service document with a first service document stored in the first database; and updating the first service document stored in the first database according to a result of the comparison.

9. A data query apparatus, the apparatus comprising:

processing circuitry configured to:

obtain a first query result of a first database in response to a query request, the first database storing data of a first time window;

obtain a second query result of a second database when the first query result does not meet a preset check condition, the second database storing data of a second time window, a start time of the second time window being after a start time of the first time window; and generate a target query result based on at least one of the first query result or the second query result, wherein an update frequency of the second database is higher than an update frequency of the first database;

the second database includes a vector database and a document database, associations between the vector database and the document database being indicated in an index file; and the processing circuitry is configured to:

add a second service document that is generated within the second time window to the document database; and slice the second service document to obtain a plurality of document slices and store a plurality of slice vectors corresponding to the plurality of document slices in the vector database.

10. The apparatus according to claim 9, wherein the processing circuitry is further configured to:

obtain target query information included in the query request;

query the vector database based on vector information corresponding to the target query information to obtain a vector query result; and obtain, based on the index file, a second document query result corresponding to the vector query result from the document database.

11. The apparatus according to claim 10, wherein the processing circuitry is further configured to:

obtain key information in the query request;

determine a plurality of preceding query requests having an association relationship with the query request; and process the key information in the plurality of preceding query requests to obtain the target query information.

12. The apparatus according to claim 11, wherein, when the first query result does not meet the preset check condition, the first query result is null; or the first query result does not match check information in the target query information and the check information includes timestamp information.

13. The apparatus according to claim 12, wherein the target query information includes question information in a question answering scenario, and the target query result includes answer information in the question answering scenario; and the processing circuitry is further configured to:

obtain time information in the query request and perform format conversion on the time information to obtain the timestamp information.

14. A non-transitory computer-readable storage medium, storing instructions which when executed by a processor cause the processor to perform:

obtaining a first query result of a first database in response to a query request, the first database storing data of a first time window;

obtaining a second query result of a second database when the first query result does not meet a preset check condition, the second database storing data of a second time window, a start time of the second time window being after a start time of the first time window; and generating, by processing circuitry, a target query result based on at least one of the first query result or the second query result, wherein an update frequency of the second database is higher than an update frequency of the first database;

the second database includes a vector database and a document database, associations between the vector database and the document database being indicated in an index file; and the instructions when executed by the processor further cause the processor to perform:

adding, to the document database, a second service document generated within the second time window; and slicing the second service document to obtain a plurality of document slices, and storing a plurality of slice vectors corresponding to the plurality of document slices in the vector database.

15. The non-transitory computer-readable storage medium according to claim 14, wherein the obtaining the second query result corresponding to the second database further comprises:

obtaining target query information included in the query request;

querying the vector database based on vector information corresponding to the target query information, to obtain a vector query result; and obtaining, based on the index file, a second document query result corresponding to the vector query result from the document database.

16. The non-transitory computer-readable storage medium according to claim 15, wherein the obtaining the target query information further comprises:

obtaining key information in the query request;

determining a plurality of preceding query requests having an association relationship with the query request; and processing the key information in the plurality of preceding query requests, to obtain the target query information.

17. The non-transitory computer-readable storage medium according to claim 16, wherein, when the first query result does not meet the preset check condition, the first query result is null; or the first query result does not match check information in the target query information and the check information includes timestamp information.

* * * * *